United States Patent
Dorwin et al.

(10) Patent No.: US 9,129,092 B1
(45) Date of Patent: Sep. 8, 2015

(54) DETECTING SUPPORTED DIGITAL RIGHTS MANAGEMENT CONFIGURATIONS ON A CLIENT DEVICE

(75) Inventors: David Kimbal Dorwin, Kirkland, WA (US); Andrew Martin Scherkus, Seattle, WA (US)

(73) Assignee: Google Inc., Mountain View, CA (US)

( * ) Notice: Subject to any disclaimer, the term of this patent is extended or adjusted under 35 U.S.C. 154(b) by 60 days.

(21) Appl. No.: 13/610,632

(22) Filed: Sep. 11, 2012

Related U.S. Application Data

(60) Provisional application No. 61/569,755, filed on Dec. 12, 2011.

(51) Int. Cl.
*G06F 7/04* (2006.01)
*G06F 17/30* (2006.01)
(Continued)

(52) U.S. Cl.
CPC ............ *G06F 21/10* (2013.01); *H04L 63/0428* (2013.01); *H04L 2209/603* (2013.01); *H04L 2463/101* (2013.01); *H04N 21/25825* (2013.01); *H04N 21/25833* (2013.01); *H04N 21/4516* (2013.01)

(58) Field of Classification Search
CPC .................. H04N 21/25808; H04N 21/25833; H04N 21/4508; H04N 21/4516; H04N 21/25825; H04L 2463/101; H04L 2209/603; H04L 63/0428; G06F 21/10
USPC ...................................................... 726/29, 27
See application file for complete search history.

(56) References Cited

U.S. PATENT DOCUMENTS

| 4,535,355 | A | 8/1985 | Arn et al. |
| 4,694,489 | A | 9/1987 | Frederiksen |

(Continued)

FOREIGN PATENT DOCUMENTS

| EP | 0658054 A2 | 6/1995 |
| EP | 0714204 A2 | 5/1996 |

(Continued)

OTHER PUBLICATIONS

Hickson, Ian, "HTML5 a Vocabulary and Associated APIs for HTML and XHTML, W3C Working Draft", Oct. 19, 2010, pp. 169-170, http://www.w3.org/TR/2010/WD-html5-20101019/.*

(Continued)

*Primary Examiner* — Linglan Edwards
*Assistant Examiner* — Forrest Carey
(74) *Attorney, Agent, or Firm* — Fenwick & West LLP

(57) ABSTRACT

A content protection query module (CPQM) dynamically queries content protection items supported on the client device. The CPQM automatically identifies content protection configurations, based on the results of the queries. Using a variety of business rules and policies, the CPQM may select a content protection configuration from the configurations for packaging and providing protected content to the client device. The CPQM may instruct the client device to expect the protected content in the selected configuration, thereby enabling the client device to configure itself, as appropriate, for such configuration. The client device may include a media player that selects based on the instructions which DRM module to employ, providing the DRM module with instructions regarding where to obtain decryption keys/licenses for the content, and even instructing the DRM module which decryption mechanism to employ to decrypt the received protected content.

19 Claims, 5 Drawing Sheets

(51) Int. Cl.
*H04N 7/16* (2011.01)
*G06F 21/10* (2013.01)
*H04L 29/06* (2006.01)
*H04N 21/45* (2011.01)
*H04N 21/258* (2011.01)

(56) References Cited

U.S. PATENT DOCUMENTS

| | | |
|---|---|---|
| 5,067,035 A | 11/1991 | Kudelski et al. |
| 5,134,656 A | 7/1992 | Kudelski |
| 5,144,663 A | 9/1992 | Kudelski et al. |
| 5,191,611 A | 3/1993 | Lang |
| 5,339,413 A | 8/1994 | Koval et al. |
| 5,375,168 A | 12/1994 | Kudelski |
| 5,392,351 A | 2/1995 | Hasebe et al. |
| 5,487,167 A | 1/1996 | Dinallo et al. |
| 5,539,450 A | 7/1996 | Handelman |
| 5,590,200 A | 12/1996 | Nachman et al. |
| 5,592,212 A | 1/1997 | Handelman |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,974,549 A | 10/1999 | Golan |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,753 A | 10/2000 | Zhao et al. |
| 6,157,721 A | 12/2000 | Shear et al. |
| 6,160,891 A | 12/2000 | Al-Salqan |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 | 5/2001 | Downs et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,460,023 B1 | 10/2002 | Bean et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelman |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,792,113 B1 | 9/2004 | Ansell et al. |
| 7,007,170 B2 | 2/2006 | Morten |
| 7,165,175 B1 | 1/2007 | Kollmyer et al. |
| 7,356,143 B2 | 4/2008 | Morten |
| 7,578,002 B2 | 8/2009 | Risan et al. |
| 7,640,435 B2 | 12/2009 | Morten |
| 7,805,616 B1 | 9/2010 | Mohammed et al. |
| 7,817,608 B2 | 10/2010 | Rassool et al. |
| 7,827,613 B2 | 11/2010 | Koved et al. |
| 7,953,882 B2 | 5/2011 | Shukla et al. |
| 8,560,642 B2 | 10/2013 | Pantos et al. |
| 2002/0001385 A1 | 1/2002 | Kawada et al. |
| 2002/0015498 A1 | 2/2002 | Houlberg et al. |
| 2002/0021761 A1 | 2/2002 | Zhang et al. |
| 2002/0021805 A1 | 2/2002 | Schumann et al. |
| 2002/0049679 A1 | 4/2002 | Russell et al. |
| 2002/0089410 A1 | 7/2002 | Janiak et al. |
| 2002/0104004 A1 | 8/2002 | Couillard |
| 2002/0107803 A1 | 8/2002 | Lisanke et al. |
| 2002/0141582 A1 | 10/2002 | Kocher et al. |
| 2003/0007568 A1 | 1/2003 | Hamery et al. |
| 2003/0046568 A1 | 3/2003 | Riddick et al. |
| 2004/0031856 A1 | 2/2004 | Atsmon et al. |
| 2004/0117500 A1 | 6/2004 | Lindholm et al. |
| 2004/0151315 A1 | 8/2004 | Kim |
| 2004/0184616 A1* | 9/2004 | Morten ................... 380/285 |
| 2004/0230806 A1 | 11/2004 | Lisanke |
| 2005/0027871 A1 | 2/2005 | Bradley et al. |
| 2005/0066353 A1 | 3/2005 | Fransdonk |
| 2005/0125358 A1 | 6/2005 | Levin et al. |
| 2005/0193205 A1 | 9/2005 | Jacobs et al. |
| 2005/0273862 A1 | 12/2005 | Benaloh et al. |
| 2006/0020811 A1 | 1/2006 | Tan |
| 2006/0212363 A1 | 9/2006 | Peinado et al. |
| 2006/0280150 A1 | 12/2006 | Jha et al. |
| 2007/0005795 A1 | 1/2007 | Gonzalez |
| 2007/0160208 A1 | 7/2007 | MacLean et al. |
| 2007/0204300 A1* | 8/2007 | Markley et al. ............. 725/46 |
| 2007/0209005 A1 | 9/2007 | Shaver et al. |
| 2007/0219917 A1 | 9/2007 | Liu et al. |
| 2007/0294170 A1 | 12/2007 | Vantalon et al. |
| 2008/0027871 A1 | 1/2008 | Seo |
| 2008/0052641 A1 | 2/2008 | Brown et al. |
| 2008/0137848 A1 | 6/2008 | Kocher et al. |
| 2008/0147671 A1 | 6/2008 | Simon et al. |
| 2008/0155586 A1 | 6/2008 | Yang et al. |
| 2008/0155673 A1 | 6/2008 | Jung et al. |
| 2008/0267399 A1 | 10/2008 | Medvinsky et al. |
| 2008/0288611 A1 | 11/2008 | Toyomura et al. |
| 2008/0307454 A1 | 12/2008 | Ahanger et al. |

(56) References Cited

U.S. PATENT DOCUMENTS

| | | | |
|---|---|---|---|
| 2008/0313264 A1 | 12/2008 | Pestoni | |
| 2009/0007198 A1 | 1/2009 | Lavender et al. | |
| 2009/0031408 A1 | 1/2009 | Thom et al. | |
| 2009/0044008 A1 | 2/2009 | Lim | |
| 2009/0183001 A1 | 7/2009 | Lu et al. | |
| 2009/0197238 A1 | 8/2009 | Moffatt et al. | |
| 2009/0208016 A1 | 8/2009 | Choi et al. | |
| 2009/0249426 A1 | 10/2009 | Aoki et al. | |
| 2010/0023760 A1 | 1/2010 | Lee et al. | |
| 2010/0027974 A1 | 2/2010 | Ansari | |
| 2010/0145794 A1 | 6/2010 | Barger et al. | |
| 2010/0180289 A1 | 7/2010 | Barsook et al. | |
| 2010/0199104 A1 | 8/2010 | Van Rijnswou | |
| 2010/0211776 A1 | 8/2010 | Gunaseelan et al. | |
| 2010/0235820 A1 | 9/2010 | Khouzam et al. | |
| 2010/0242097 A1 | 9/2010 | Hotes et al. | |
| 2010/0250532 A1 | 9/2010 | Soroushian et al. | |
| 2010/0299701 A1 | 11/2010 | Liu et al. | |
| 2011/0069936 A1* | 3/2011 | Johnson et al. | 386/248 |
| 2011/0179283 A1 | 7/2011 | Thom et al. | |
| 2011/0225417 A1 | 9/2011 | Maharajh et al. | |
| 2011/0305273 A1 | 12/2011 | He et al. | |
| 2011/0314284 A1 | 12/2011 | Chou | |
| 2012/0066494 A1 | 3/2012 | Lee et al. | |
| 2012/0079578 A1 | 3/2012 | Dachiraju et al. | |
| 2012/0114118 A1 | 5/2012 | Verma | |
| 2012/0117183 A1 | 5/2012 | Wong et al. | |
| 2012/0173884 A1 | 7/2012 | Patil | |
| 2012/0317414 A1 | 12/2012 | Glover | |
| 2012/0331293 A1 | 12/2012 | Ma et al. | |
| 2013/0072126 A1 | 3/2013 | Topaltzas et al. | |
| 2013/0097302 A9 | 4/2013 | Khedouri et al. | |
| 2013/0145406 A1* | 6/2013 | Baskaran et al. | 725/87 |
| 2013/0174222 A1 | 7/2013 | Ogle | |

FOREIGN PATENT DOCUMENTS

| | | |
|---|---|---|
| EP | 0852445 A2 | 7/1998 |
| EP | 0886409 A2 | 12/1998 |
| EP | 1134977 A1 | 9/2001 |
| EP | 1246463 A2 | 10/2002 |
| JP | 03203432 A | 9/1991 |
| JP | 08335040 A | 12/1996 |
| JP | 10336128 A | 12/1998 |
| JP | 11175475 A | 7/1999 |
| JP | 2000022680 A | 1/2000 |
| JP | 2000196585 A | 7/2000 |
| JP | 2000293945 A | 10/2000 |
| JP | 2001251599 A | 9/2001 |
| WO | 96/06504 A1 | 2/1996 |
| WO | 96/32702 A1 | 10/1996 |
| WO | 99/21364 A1 | 4/1999 |
| WO | 99/28842 A1 | 6/1999 |
| WO | 99/30499 A1 | 6/1999 |
| WO | 99/54453 A1 | 10/1999 |
| WO | 01/35571 A1 | 5/2001 |
| WO | 01/93212 A2 | 12/2001 |
| WO | 02/21761 A2 | 3/2002 |
| WO | 04/02112 A1 | 12/2003 |

OTHER PUBLICATIONS

"Digital rights management," Wikipedia, the free encyclopedia, last modified Mar. 30, 2012, 30 pages http://en.wikipedia.org/w/index.php?title=Digital_rights_management&printable=yes.

"Establishing Interconnectivity among Various Makers' Products through Standardization of VOD Protocol", NTT Corporation Press Release, Sep. 27, 2002 http://www.ntt.co.jp/news/news02e/0209/020927.html.

"High-bandwidth Digital Content Protection," Wikipedia, the free encyclopedia, last modified Nov. 14, 2012, 7 pages http://en.wikipedia.org/w/index.php?title=High-bandwidth_Digital_Content_Protection&printable=yes.

"Intelligent Systems for Finance and Business," Goonatilake, S. et al., eds., Chapters 2-10, 1995, pp. 31-173.

"Irdeto Access and Optibase create Strategic Alliance", Press Release, Irdeto Access, Dec. 14, 2000 pp. 1-4 http://www.irdetoacess.com/press/000004.htm.

"Irdeto Access and Optibase create Strategic Alliance", Press Release, Optibase, Dec. 14, 2000, pp. 1-2 http://www.optibase.com/html/news/December_14_2000.html.

"PlayReady," Wikipedia, the free encyclopedia, last modified Jan. 30, 2012, 2 pages http://en.wikipedia.org/w/index.php?title=PlayReady&printable=yes.

"Scable Video Coding," Wikipedia, the free encyclopedia, last modified Sep. 10, 2012, 4 pages http://en.wikipedia.org/w/index.php?title=Scalable_Video_Coding&printable=yes.

"UltraViolet (system)," Wikipedia, the free encyclopedia, last modified Feb. 20, 2012, 5 pages http://en.wikipedia.org/w/index.php?title=UltraViolet_(system)&printable=yes.

"What is HDCP (high definition copy protocol)?" Digital Connection, 2005, 2 pages http://www.digitalconnection.com/FAQ/HDTV_12.asp.

Balthrop, J. e al., "Coveage and Generalization in an Artificial Immune Sysem"Poeedings of Genetic and Evolutionary Computation Conference (GECCO), 2002, pp. 1-8.

Blumenfeld, S. M., "Streaming Media—System Security," Broadcast Engineering Magazine, Oct. 2001, pp. 1-2.

Canadian Examiner Report for Application No. 2,559,323 mailed May 6, 2008, 3 pages.

Cheng, H. C. H., "Partial Encryption for Image and Video Communication", Department of Computing Science, University of Alberta, Fall 998, pp. 1-87.

Cheng, H. et al., "Partial Encryption of Compressed Images and Videos", IEEE Transactions on Signal Processing, vol. 48, No. 8, Aug. 2000, pp. 2439-2451.

Deitcher, D., "Secure Implementations of Content Protection (DRM) Schemes on Consumer Electronic Devices," Discretix, White Paper, May 2011, 17 pages.

Eskicioglu, A. M. et al., "An Overview of Multmedia Content Protection in Consumer Eecronics Devices", SP:IC, vol. 16 No. 7, Apr. 2001, pp. 681-699.

Ferrill, E. et al, "A Survey of Digital Watermarking", Feb. 25, 1999, 15 pages http://elizabeth.ferrill.com/papers/watermarking.pdf.

Forrest, S., "Research Projects," Dec. 2, 2003, pp. 1-3 http://www.cs.unm.edu/.about.forrest/projects.html.

Goodman, J. et al., "Low Power Scalable Encryption for Wireless Systems", Wireless Networks, No. 4, 1998, pp. 55-70.

Griwodz, C. et al., "Protecting VoD the Easier Way", ACM Multimedia, Bristol, UK, Jan. 1998, pp. 21-28.

Griwodz, C., "Video Protection by Partial Content Corruption", Multimedia and Security Workshop at ACM Multimedia, Bristol, UK, Sep. 1998, pp. 1-5.

Hunter, J., et al., "A Review of Video Streaming Over the Internet", DSTC Technical Report TR97-10, Aug. 1997, pp. 1-28.

International Search Report and Written Opinion for International Patent Application No. PCT/US07/62055 mailed Sep. 11, 2007.

Kirovski, D. et al, "Digital Rights Management for Digital Cinema", Proceedings of the SPIE Bellingham, VA, vol. 4472, Jul. 31, 2001, p. 105-120.

Office Action for European Patent Application No. 05250968.4 mailed Jan. 26, 2006.

Official Communication for Chinese Patent Application No. 2004800071571 mailed Apr. 13, 2007.

Official Communication for European Patent Application No. 04757582.4 mailed May 22, 2007.

Omneon Video Networks Product Announcement, "Broadband Streaming—Omneon and BSkyB", TB-1006-1, created 2002, pp. 1-4.

Schulzrinne, H., et al.; "Real Time Streaming Protocol (RTSP)," RFC 2326, Apr. 1998, pp. 1-86.

Schulzrinne, H., et al. "RTP: A Transport Protocol for Real-Time Applications", RFC 1889, Jan. 1996, pp. 1-75.

Search Report for European Patent Application No. 05250968.4 mailed Oct. 12, 2005.

(56) References Cited

OTHER PUBLICATIONS

Spanos, G. et al., "Performance Study of a Selective Encryption Scheme for the Security of Networked, Real-Time Video", Proceedings of the Fourth International Conference on Computer Communications and Networks, ICCCN '95, Las Vegas, NV, Sep. 1995, pp. 2-10.

Supplementary European Search Report for European Patent Application No. 00986215 dated Nov. 14, 2005.

Supplementary European Search Report for European Patent Appliation No. 04757582.4 mailed Nov. 20, 2006.

Teixeira, L. M. et al, "Secure Transmission of MPEG Video Sources", Proceedings of IEEE Workshop on ISPACS, Nov. 6, 1998, pp. 1-5.

Wu, T.-L. et al., "Selective Encryption and Watermarking of MPEG Video (Extended Abstract)", submitted to International Conference on Image Science, Systems, and Technology, Feb. 17, 1997, 10 pages.

Yoshida, K. et al., "A Continuous-Media Communication Method for Minimizing Playback Interruptions", IS&T/SPIE Conference on Visual Communications and Image Processing, San Jose, California, vol. 3653, Jan. 1999, 10 pages.

Zhang, J. et al., "A Flexible Content Protection System for Media-On-Demand", Proceedings of the Fourth International Symposium on Multimedia Software Engineering 2002, Dec. 11-13, 2002, Piscataway, NJ, Dec. 11, 2002, pp. 272-277.

Colwell, A., "Proposal for a MediaSource API that allows sending media data to a HTMLMediaElement," Jul. 11, 2011, pp. 1-11 http://lists.whatwg.org/pipermail/whatwg-whatwg.org/2011-July/0323.84.html.

Official Communication for U.S. Appl. No. 13/437,789 mailed Nov. 13, 2013.

Official Communication for U.S. Appl. No. 13/532,734 mailed Oct. 23, 2013.

Official Communication for U.S. Appl. No. 13/654,271 mailed Oct. 24, 2013.

Official Communication for U.S. Appl. No. 13/654,237 mailed Oct. 23, 2013.

Official Communication for U.S. Appl. No. 13/712,764 mailed Nov. 7, 2013.

"A new approach to browser security: the Google Chrome Sandbox," Chromium Blog, http://blog.chromium.org/2008/10/new-approach-to-browser-security-google.html, 5 pages, Oct. 2, 2008.

"Conditional access," Wikipedia, the free encyclopedia, http://en.wikipedia.org/wiki/Conditional_access, 8 pages, created Jul. 7, 2005.

"Encrypted Media Extensions, W3C Editors Draft Dec. 17, 2012," W3C, http://dvcs.w3.org/hg/html-media/raw-file/tip/encrypted-media/encrypted-media.html, 32 pages, created Feb. 22, 2012, current draft dated Dec. 17, 2012.

"Getting Started: Background and Basics—The Chromium Projects," http://chromium.org/nativeclient/getting-started/getting-started-background-and-basics, 4 pages, Sep. 2, 2008.

"Google Native Client:" Wikipedia: the free encyclopedia, http://en.wikipedia.org/wiki/Google_Native_Client, 6 pages, created Dec. 9, 2008.

"HTML5," Wikipedia, the free encyclopedia, http://en.wikipedia.org/wiki/HTML5, 9 pages, created Nov. 16, 2006.

"Media Source Extensions, W3C Editor's Draft Dec. 18, 2012," http://dvcs.w3.org/hg/html-media/raw-file/tip/media-source/media-source.html, 25 pages, created Jul. 11, 2011, current draft dated Dec. 18, 2012.

"Media Source Extensions," http://html5-mediasource-api.googlecode.com/svn/trunk/draft-spec/mediasource-draft-spec.html, 1 page, Jul. 11, 2011.

"MediaSource Extensions v0.3," editor A. Colwell, http://html5-mediasource-api.googlecode.com/svn/tags/0.3/draft-spec/mediasource-draft-spec.html, 14 pages, Mar. 13, 2012.

"Multimedia over Coax Alliance," Wikipedia, the free encyclopedia, http://en.wikipedia,org/wiki/Multimedia_over_Coax_Alliance, 4 pages, created Jun. 11, 2006.

"Sandbox—The Chromium Projects," http://dev.chromium.org/developers/design-documents/sandbox, 8 pages, Sep. 2, 2008.

"W3C HTML Working Group," http://www.w3.org/html/wg, 9 pages, May 9, 2007.

"Web Cryptography Working Group Charter," W3C Technology and Society domain, http://www.w3.org/2011/11/webcryptography-charter.html, 6 pages, Apr. 3, 2012.

Barth, A. et al., "The Security Architecture of the Chromium Browser," Technical Report, Stanford University, 2008.

Glazkov, D., "What the Heck is Shadow DOM?," htp://glazkov.com/2011/01/14/what-the-heck-is-shadow-dom, 14 pages, Jan. 14, 2011.

Metz, C., "Google Native Client: The web of the future—or the past?" The Register, http://www.theregister.co.uk/2011/09/12/google_native_client_from_all_sides/print.html, 13 pages, Sep. 12, 2011.

Yee, B. et al., "Native Client: A Sandbox for Portable, Untrusted x86 Native Code," IEEE Symposium on Security and Privacy, Oakland 2009, 15 pages, May 16-19, 2009.

Official Communication for U.S. Appl. No. 13/437,789 mailed Aug. 14, 2013.

Official Communication for U.S. Appl. No. 13/586,664, mailed Jun. 20, 2013.

Official Communication for U.S. Appl. No. 13/437,789 mailed Mar. 26, 2013.

Officiai Communication for U.S. Appl. No. 13/586,664 mailed Dec. 26, 2013.

\* cited by examiner

DETECTING SUPPORTED DIGITAL RIGHTS MANAGEMENT CONFIGURATIONS ON A CLIENT DEVICE

CROSS-REFERENCE TO RELATED APPLICATION

This application is a utility patent application based on previously filed U.S. Provisional Patent Application Ser. No. 61/569,755 filed on Dec. 12, 2011, the benefit of which is hereby claimed under 35 U.S.C. §119(e) and which is incorporated herein by reference.

TECHNICAL FIELD

The present embodiments relate generally to playing protected content and, more particularly, but not exclusively, to detecting content protection configurations, including but not limited to Digital Rights Management (DRM) modules, decryption standards, compression/decompression standards, container formats, and so forth supported on a client device.

BACKGROUND

Today, there is a desire by many individuals, organizations, and businesses to protect their rights to media content that they produce from improper copying, and/or distribution. At least some of these desires arise in part because these individuals, organizations, and/or businesses are at least in part dependent upon revenue generated from their media content. Such media content may include virtually any format or form, including songs, videos, images, documents, games, books, articles, and/or other audio content, to name just a few examples of media content that some parties may wish to protect.

One class of solutions that has been implemented to attempt to address this desire is known as Digital Rights Management (DRM). Briefly, DRMs provide access control technologies used by publishers, copyright holders, and others to control their media content after it is given to a consumer, from improper access, copying, and/or distribution.

However, there are a large number of these DRM solutions available and in use by various media content distributors, media player manufacturers, and so forth. Moreover, a user of their client device often downloads and installs a variety of different DRM solutions, whether intentionally, along with other software, or because a website that they may visit requires such downloads. The result is that each client device may have vastly different DRM solutions on their client device. Moreover, even within a given DRM solution, user client devices may have vastly different versions of DRM solutions with vastly different capabilities, and/or constraints.

Additionally, content provided over a network, may be encrypted using any of a variety of different encryption mechanisms, and even encapsulated using any of a variety of different formats, sometimes called containers. When the possible combinations of DRM solutions, encryption mechanisms, and/or container formats are considered, a content provider may have significant difficulties in determining how to package and provide their protected content to a client device, that may then negotiate decryption keys and/or DRM licenses, decrypt the content, and then successfully play the protected content. However, failure to address this plethora of different configurations might result in the content provider being unable to provide playable content to the client device, and therefore, potentially losing revenue. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

Figure 1:
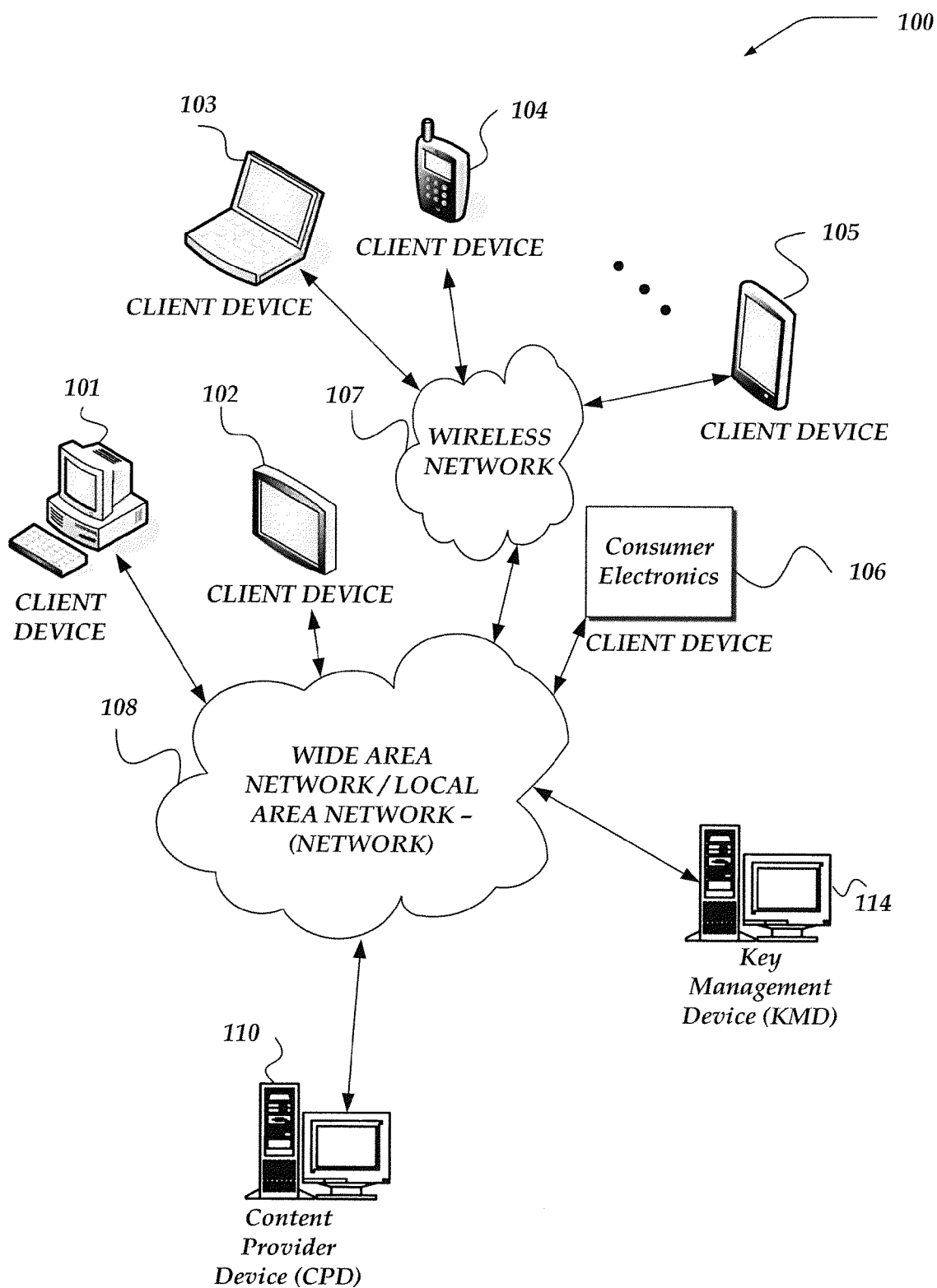
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "content" or "media content" includes any digital data that may be communicated over a network to be remotely played by a computing device. Non-exhaustive examples of content include but are not limited to movies, videos, music, spoken word, pictures, illustrations, graphics, images, text, and the like. Content is often described by its format, or container, in which the content is provided. Thus, as used here, the term "container" refers to a data stream or file format which encapsulates audio and visual content. This content often consists of interleaved audio and video data in frames, or slices, with accompanying metadata such as frame timing information, audio and/or video configuration information, encoding information, compression information, and the like. Also, the container is typically arranged to enable content to be presented for playback at a remotely located network device, such as a client device. A container may also be named a "systems stream". A non-limiting and non-exhaustive list of examples of container/system streams formats are: MPEG2-TS (Moving Picture Experts Group ("MPEG") transport stream ("TS")), flash video ("FLV"), MOV (a QuickTime file format), MP4, 3GP, and ASF (Advanced Systems Form), WebM Project file format, Matroska multimedia container format, or the like. A video encoding format, such as H.264, VP8, or the like, may be encapsulated in the container. The content may be distributed as a rights managed systems stream of data over a network such as Pay per View (PPV), Video On Demand (VoD), live streaming, or the like for playback by a remote network device. In one embodiment, the content may be protected through a license that describes how, where, when, by whom, or so forth, content that is protected may be accessed, distributed, copied, or the like. Protected content may be protected using a variety of content protection mechanisms, including through one or more Digital Rights Management (DRM) policies, licenses, and encryption/decryption keys.

As used herein, encryption refers to the process of transforming digital content (referred to as plaintext) using an algorithm (called a cipher) to make it unreadable to anyone except those possessing special knowledge, usually referred to as a key. Decryption is the process of converting encrypted digital content back into its original form. As used herein, "unencrypted" digital content refers to digital content received in plaintext—or that is otherwise not encrypted, and therefore does not need to be decrypted. It should be understood such plaintext digital content, may be received, in at least one embodiment, in a compressed form, or encoded form, and still be considered as plaintext for the purposes described herein. Moreover, as discussed further below, digital content may include portions that are encrypted, and other portions that are unencrypted within a same stream of digital content. Further, different encrypted portions of the stream of digital content may be encrypted using different encryption keys, and/or employ different licenses. In one embodiment, keys useable for decrypting the differently encrypted digital content may be rotated, reused, or renegotiated.

As used herein, the term "automatically," refers to actions performed by a computing device based on one or more decisions performed by the computing device, without an input from a user to directly initiate or otherwise direct the action.

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards providing to a client device, a content protection query module (CPQM) that is configured to dynamically and automatically query types of content protection items supported on the client device. The CPQM may then automatically create a table, spreadsheet, list, or virtually any other structure for identifying and managing one or more different content protection configurations supported by the client device, based on the results of the query. Then, using a variety of business rules and policies, the CPQM may select at least one content protection configuration for packaging and providing protected content to the client device. In one embodiment, the CPQM may further instruct the client device to expect the protected content in the selected configuration, thereby enabling the client device to configure itself, as appropriate, for such configuration. In one embodiment, the client device may include a media player that then selects which DRM module to employ, providing the DRM module with instructions regarding where to obtain decryption keys/licenses for the content, and even instructing the DRM module which decryption mechanism to employ to decrypt the received protected content, and/or container in which the content may be packaged.

It should be understood that while embodiments described herein are directed towards determining a content protection configuration on a client device, the innovations are not so constrained. Thus, in other embodiments, selection of which media player to employ, and/or other devices to employ may also be included.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 108, wireless network 107, client devices 101-106, Content Provider Device ("CPD") 110, and Key Management Device (KMD) 114.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

A web-enabled client device may include a browser application that is configured to receive and to send web pages, web-based messages, and the like. The browser application may be configured to receive and display graphics, text, multimedia, media content, and the like, employing virtually any Internet based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, CPD 110, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device, such as CPD 110, or the like. Such end-user account, in one non-limiting example, may be configured to enable the end-user to manage one or more online activities, including in one non-limiting example, search activities, social networking activities, browse various websites, communicate with other users, or the like. In one embodiment, the end-user's client device may receive content streamed to the client device for play at the client device. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, CPD 110, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSL5"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

One embodiment of CPD 110 is described in more detail below in conjunction with FIG. 3. Briefly, however, CPD 110 includes virtually any network device usable to operate as a content server to connect to network 108 to provide content to client devices 101-106. In some embodiments, CPD 110 may provide protected content to a client device. In one embodiment, at least some portions of the content may be encrypted, while at least some other portions of the content may be unencrypted.

CPD 110 may also provide to a client device a Content Protection Query Module (CPQM) that is configured to automatically and dynamically query a content protection configuration of a client device. CPQM may be implemented using any of a variety of mechanisms, including but not limited to a set of HyperText Markup Language (HTML) instructions, a script, an applet, an application, or the like. The CPQM may provide information about the content protection configuration to CPD 110. CPD 110, or the CPQM module, may then select a particular content protection configuration that the client device supports, to provide protected content to the client device. In one embodiment, the CPQM module and/or CPD 110 may instruct the client device to configure itself to receive content using the selected content protection configuration. The CPQM module and/or CPD 110 may use a process such as is described below in more detail in conjunction with FIG. 4 to perform at least some of its actions.

It should be readily recognized that CPD 110 is configured to operate on behalf of a content owner, distributor, or similar business entity. However, while used herein to represent such network devices useable to provide content, it is further recognized that other devices may also be employed. For example, a content provider may employ a Content Distribution Network Device (not shown) that operates on behalf of the content provider to provide content. Thus, other configurations and variations of devices serving content are also envisaged, and other embodiments are not constrained to a single configuration/arrangement of devices.

Devices that may operate as CPD 110 include various network devices, including, but not limited to personal computers, desktop computers, multiprocessor systems, microprocessor-based or programmable consumer electronics, network PCs, server devices, network appliances, and the like.

Although FIG. 1 illustrates CPD 110 as a single computing device, the invention is not so limited. For example, one or more functions of CPD 110 may be distributed across one or more distinct network devices. Moreover, CPD 110 is not limited to a particular configuration. Thus, in one embodiment, CPD 110 may contain a plurality of network devices to provide content, licenses, and/or decryption keys to a client device, such as client devices 101-106. Similarly, in another embodiment, CPD 110 may contain a plurality of network devices that operate using a master/slave approach, where one of the plurality of network devices of CPD 110 operates to manage and/or otherwise coordinate operations of the other network devices. In other embodiments, the CPD 110 may operate as a plurality of network devices within a cluster architecture, a peer-to-peer architecture, and/or even within a cloud architecture. Thus, the invention is not to be construed as being limited to a single environment, and other configurations, and architectures are also envisaged.

In one embodiment, CPD 110 may also be configured to manage license requests, and/or access to decryption keys useable to decrypt portions of the encrypted digital content by a client device for play based on the license.

It should be noted that the encrypted content may be encrypted using any of a variety of symmetric and/or asymmetric key technologies. For example, possible asymmetric keys technologies include, but are not limited to, Diffie-Hellman, RSA, Merkle-Hellman, PGP, X.509, elliptic curve techniques, EIGamal, or the like. Similarly, various possible symmetric key technologies include, but are not limited to, Twofish, Serpent, Advanced Encryption Standard (AES), Blowfish, CASTS, RC4, 3DES, and IDEA, to name just a few. Moreover, the content may be protected using a combination of symmetric and asymmetric key technologies. For example, a symmetric content decryption key might be used to encrypt/decrypt the content, and an asymmetric key technology might be used to encrypt/decrypt the content decryption key.

KMD 114 represents one of a variety of network devices for managing access to symmetric and/or asymmetric keys. In one embodiment, KMD 114 may operate to certify an ownership of a public key named within a digital certificate that provides a public key, where the public key is part of a public/private key associated with any of a variety of asymmetric key technologies. This allows others, such as CPD 110, or the like, to rely upon signatures or assertions made by the owner that corresponds to the public key that is certified. In one embodiment, KMD 114 may then operate as a trusted third party. Thus, in one embodiment, KMD 114 may operate as a Certification Authority, such as employed by many public key infrastructures (PKI) schemes. Further, KMD 114 may also provide Certificate Revocation Lists (CRLs) indicating when a public key/certificate is no longer valid, and might no longer be trusted/trustable.

In one embodiment, KMD 114 may receive a public key from a content provider, or the like, and based on various criteria, elect to make accessible the public key through a certificate that KMD 114 digitally signs. In one embodiment, access to the public key may enable an authorized client device to decrypt a content key that may then be used to decrypt at least a portion of the encrypted content.

In one embodiment, KMD 114 or CPD 110 might operate to negotiate a license and/or access to a key with client devices 101-106. In one embodiment, different content decryption keys might be used to encrypt different portions of a provided content. Thus, in one embodiment, multiple key negotiations may be performed for a given at least one content stream.

It should be understood, that while KMD 114 is illustrated as a separate device from CPD 110, in other embodiments, the functions of these devices may be integrated.

Although FIG. 1 illustrates KMD 114 as single computing devices, the invention is not so limited. For example, one or more functions of KMD 114 may be distributed across one or more distinct network devices. Moreover, KMD 114 is not limited to a particular configuration. Thus, in one embodiment, KMD 114 may contain a plurality of network devices.

Similarly, in another embodiment, KMD 114 may contain a plurality of network devices that operate using a master/slave approach, where one of the plurality of network devices operates to manage and/or otherwise coordinate operations of the other network devices. In other embodiments, the KMD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
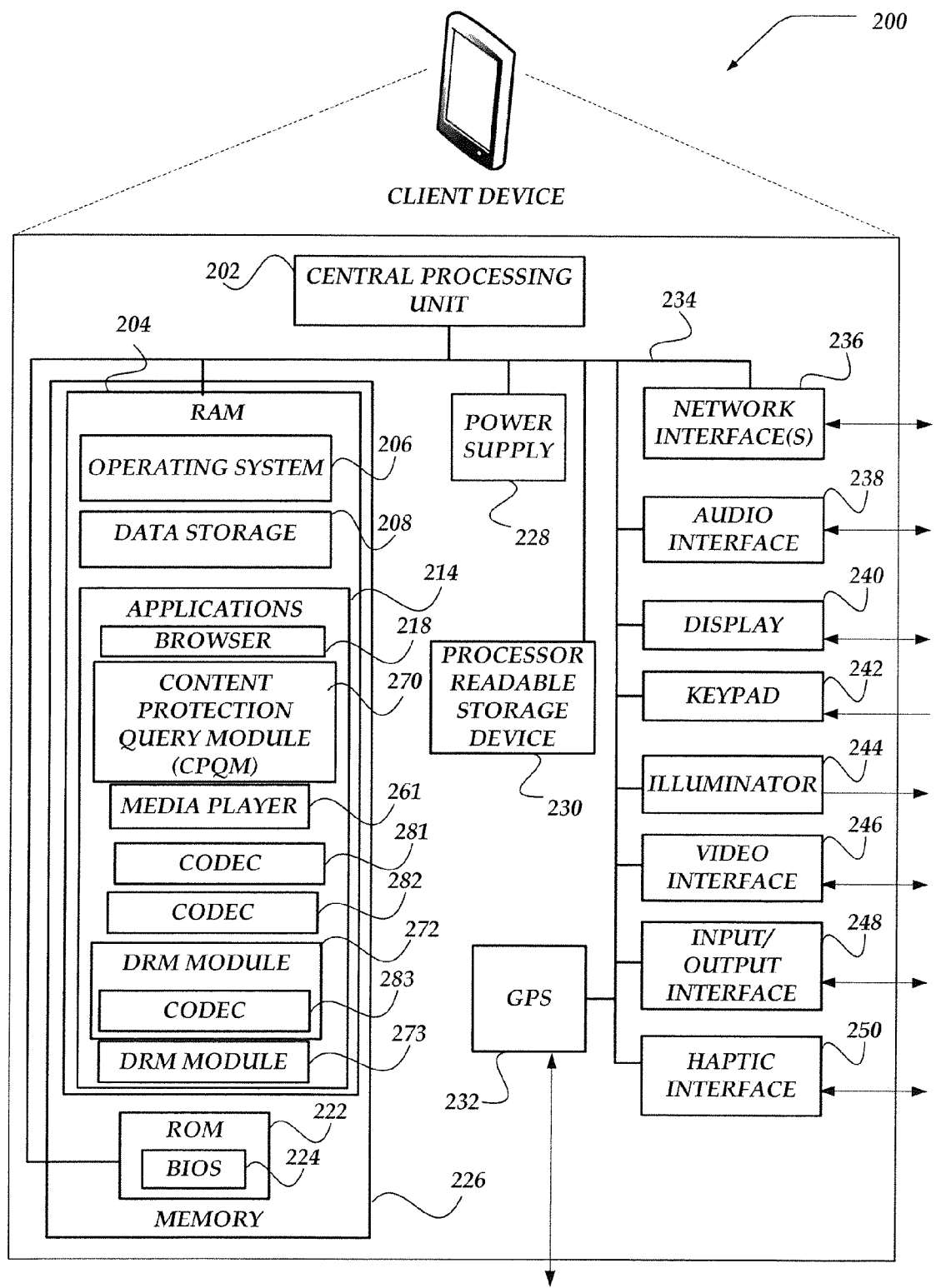
FIG. 2 illustrates one possible embodiment of a client device usable within the environment of FIG. 1.

FIG. 2 shows one embodiment of client device 200 that may be included in a system implementing the invention. Client device 200 may represent any of a variety of platforms useable to perform actions as disclosed within. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, a global positioning systems ("GPS") receiver 232, and presence detector interfaces 273.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Moreover, display 240 may be configured to employ any of a variety of network connection types, including, but not limited to High-Bandwidth Digital Content Protection (HDCP) connection types, Display Port (DP), Digital Visual Interface (DVI), and High-Definition Multimedia Interface (HDMI), as well as Gigabit Video Interface (GVIF), Standard-definition (SD), Unified Display Interface (UDI), or Intel Wireless Display (WiDi). At least some of these network connection types provide a form of digital copy protection. A detection of whether display 240 is connected through one of these, or other types, of network connection types may be determined using a variety of techniques, including signature transmissions, protocol handshakes, authentication procedures, or the like. Changing usage of a network connection type may indicate a change in the configuration of at least one component of client device 200 that might result in being detected as a compromise to the integrity of client device 200.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214, protected content, and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of network device 200, including, but not limited to computer readable storage device 230, a disk drive or other computer-readable storage device (not shown) within client device 200.

In some embodiments, data storage 208 may act as a buffer for content received from CPD 110 of FIG. 1. As noted above, it is recognized that providing of such content may also be performed by another device on behalf of CPD 110 of FIG. 1.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218, media player 261, Digital Rights Management (DRM) modules 272-273, Coder/Decoders (CODECs) 281-283 (also sometimes referred to as Compressor/Decompressor), and Content Protection Query Module (CPQM) 270. In some embodiments, CODECs may also be within a DRM, such as illustrated with CODEC 283 within DRM module 272.

Browser 218 may include virtually any application configured to receive and display graphics, text, multimedia, and the like, employing virtually any web based protocol. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to provide and/or receive content from another computing device, such as CPD 110 of FIG. 1. Although browser 218 is described herein, it should be noted that there are a plurality of other applications that may operate as a user agent configured to request and/or access content over a network. Thus, other user agents may also be included within client device 200. Moreover, while a single browser is illustrated, it should be noted that client device 200 may include a plurality of browsers or applications providing functionality of a browser application.

Media player 261 represents any of a variety of software and/or hardware configurations arranged to receive and play various content. As such, in one embodiment, media player 261 may also represent a hardware component that might be installed within client device 200 and/or coupled electrically to client device 200 to enable client device 200 to access and play content. In one embodiment, media player 261 may receive protected content from browser 218, and employ one or more of CODECs 281-283 and/or DRM modules 272-273 to enable play of the received protected content.

While a single media player 261 is illustrated, it should be understood that client device 200 may include a plurality of media players, each which may be configured to employ a different CODEC(s), and/or different DRM module(s), as well as to accept different container format(s) for the received protected content. Further, the media players, and/or browsers may also be configured to employ different levels of robustness for the client device 200, and/or other protection schemes for content.

CODECs 281-283 includes any of a variety of compression/decompression (or coding/decoding) mechanisms configured to receive compressed content and decompress the content into a format capable of being rendered for the user's enjoyment. For example, CODECs 281-283 may employ Moving Pictures Experts Group (MPEG), Joint Photographic Experts Group (JPEG), wavelets, and/or any other mechanism that compresses content that may later be decompressed. Further, although CODECs 281-283 may include capabilities for graphical content, CODECs 281-283 may also be configured to receive audio content, and as appropriate, prepare the audio content for play by a media player as well. Thus, CODECs 281-283 may not be exclusive for graphical content, and may also operate on audio, graphical content, and/or content having a combination of audio and graphical information. In one embodiment, each of CODECs 281-283 may be configured to support a particular set of decoding (decompression) mechanisms. For example, CODEC 281 might be configured to support JPEG, but not H.264; while CODEC 282 is configured to support H.264, JPEG, but not VP8. It is noted that these are examples, and not to be construed as limiting, or exhaustive, and clearly CODECs 281-283 may be configured and/or constrained in a variety of ways, beyond or instead of these examples.

DRM modules 272-273 represents any of a class of access control technologies that are configured to manage the digital access rights to protected content. In one embodiment, DRM modules 272-273 may include a content decryption module (CDM) that is configured to receive one or more decryption keys and/or licenses, and to employ the decryption keys/licenses to decrypt at least a portion of the content and enable access to the content. In one embodiment, DRM modules 272-273 might be configured to receive information indicating that content is protected with keys/licenses. DRM modules 272-273 may then send a communications requesting the keys/licenses. In one embodiment, DRM modules 272-273 might be configured to provide a communications towards a Key Management Device, such as KMD 114 of FIG. 1 to obtain the keys/licenses. DRM modules 272-273 may then receive portions of the protected content from media player 261, browser 218, or another application. DRM modules 272-273 may then employ the keys/licenses to decrypt the encrypted content and enable selected rights of use of the content. DRM modules 272-273 may provide the decrypted content to media player 261, to output hardware, and/or to CODECS 281-283 to decode/decompress the decrypted content such that it may then be played by media player 261.

It should be noted that while FIG. 2 illustrates media player 261, CODECs 281-283, and DRM modules 272-273 as separate applications from each other, it should be understood that other configurations may also be used. For example, media player 261 may operate as a plug-in application to browser 218. Further, one or more CODECs 281-283 may operate as plug-ins with media player 261, and/or browser 218 or be part of DRM modules 272-273. Further, DRM modules 272-273 may also be plug-ins or components within a media player, browser, or the like. Thus, the arrangement of components within FIG. 2 is not limiting, or exhaustive, and other arrangements may also be used.

As discussed above, it may be seen that when a given client device may include a plurality of different media players, CODECS, and/or DRM modules, each with different limitations or constraints on their functions, it may be difficult, if not expensive, for a content provider to figure out how to prepare and send protected content to different client devices.

CPQM 270 is directed towards overcoming at least this issue by querying client device 200 for what content protection items are supported, and then selecting, from the supported set a content protection configuration based on business rules and policies, a particular content protection configuration in which to prepare and send protected content.

In one embodiment, CPQM 270 may be implemented using any of a variety of mechanisms, including using HTML5 or above type of tags, scripts, commands, or the like. In one embodiment, CPQM 270 may be stored on an apparatus comprising a non-transitory computer-readable medium that has computer-executable instructions stored thereon, that in response to execution by client device 200 causes the client device to perform various actions.

CPQM 270 may also be implemented as embedded within a web page provided by a content provider. CPQM 270 may further include scripts, applets, applications, or the like, that may be downloaded, and/or installed within client device 200, or otherwise operate within client device 200 to perform its actions. In one embodiment, CPQM 270 may employ a process such as described below in conjunction with FIG. 4 to perform at least some of its actions.

Illustrative Network Device

Figure 3:
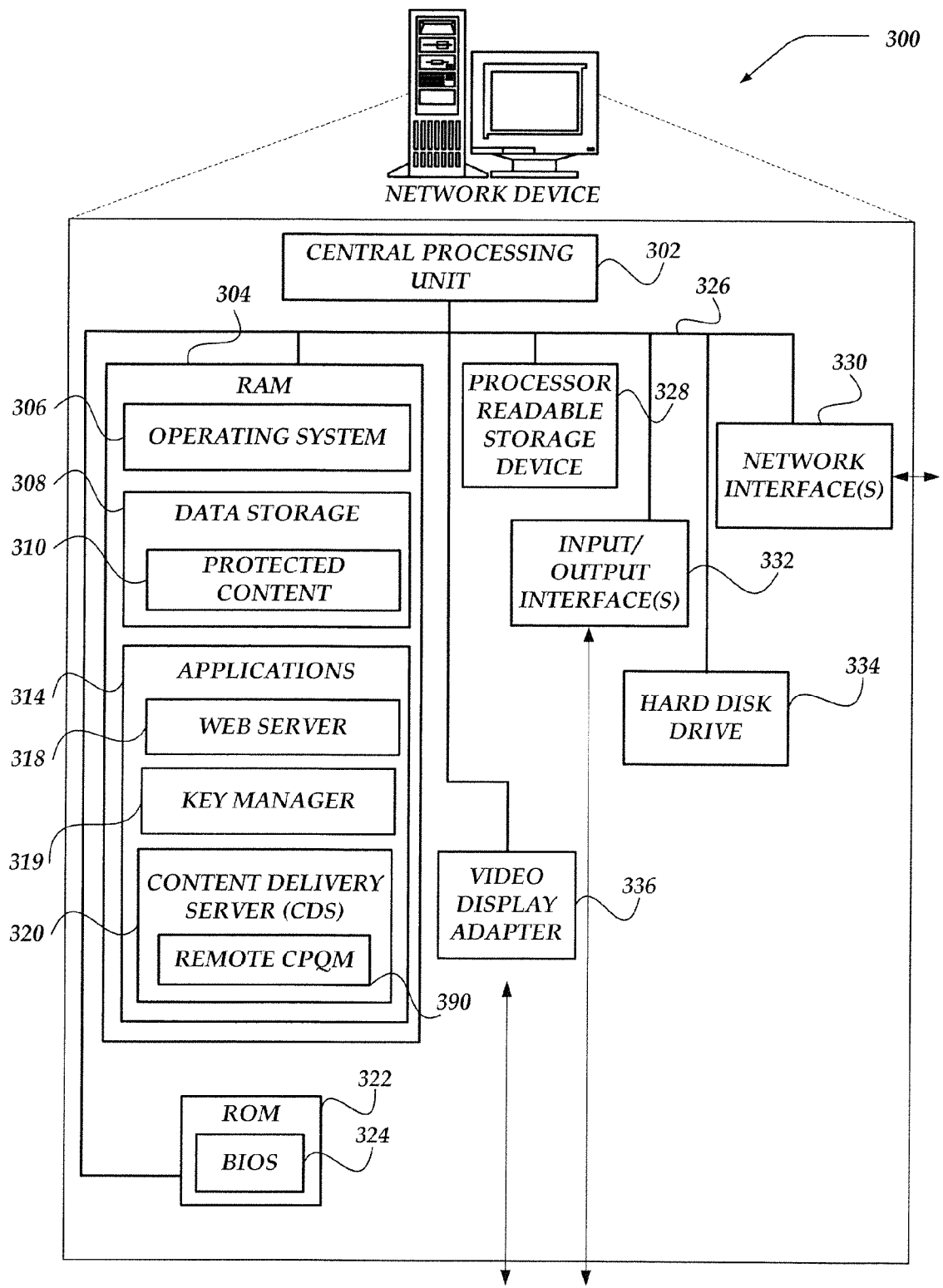
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, a client, a peer, a host, or any other device. Network device 300 may represent, for example CPD 110 of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store protected content 310. Protected content 310 represents any of a variety of content that may be protected from access using a license, encryption, and/or the like. In some embodiments, protected content 310 may include a plurality of available versions of content. In one embodiment, the available versions may include one or more video tracks and/or one or more one or more audio tracks.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, key manager 319, and content delivery server 320, may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Web Server 318 may also be configured to enable a user of a client device, such as client devices 101-106 of FIG. 1, to browse content, such as streams of protected content 310, and select content for display/play on the client device. Further, web server 318 may be configured to provide for installation and/or execution at a client device, a CPQM 270 such as discussed above in conjunction with FIG. 2.

Key manager 319 is configured to manage negotiations of decryption keys and/or licenses for content streams. In one embodiment, key manager 319 may provide decryption keys and/or licenses to KMD 114 of FIG. 1. In other embodiments, key manager 319 may perform negotiations directly with a client device. In one embodiment, key manager 319 may select one or more content decryption keys for use in encrypting different portions of a content stream.

Key manager 319 may also be configured to revoke a license, and/or invalidate one or more decryption keys, based, for example, on an unauthorized request for a license, key, or even based on receiving an indication that an integrity of a requesting client device is determined to be compromised.

Content Delivery Server (CDS) 320 is configured to manage access to protected content 310. In one embodiment, the content may be protected through a license or licenses. In another embodiment, the content may be protected by being encrypted. In one embodiment, one portion of content may be encrypted using a first content encryption key; while another portion of the content may be encrypted using a second content encryption key. Thus, to decrypt the protected content, a user's client device may need access to a license that indicates how, where, and/or when the protected content may be accessed. The user's client device may also need access to one or more decryption keys usable to decrypt various portions of the protected content. In one embodiment, where multiple encryption keys are used to encrypt the content, a key rotation scheme may be employed, where the client device is provided an indication that the content is encrypted using a different key, and that the client device will have to use the different key. However, in another embodiment, the content may be protected by a license(s) and not be encrypted using encryption key(s).

As shown, in one embodiment, CDS 320 may include a remote CPQM 390 that is configured to operate remote to a client device to perform actions and functions similar to CPQM 270 of FIG. 2. That is, operating within network device 300, remote CPQM 390 may perform query actions through, for example, a web interface, or the like, with a client device. Remote CPQM 390 may then query protection configuration items with the client device and/or perform other actions, such as described below in conjunction with FIG. 4. In this manner, a CPQM might not be loaded or installed onto a client device. Thus, embodiments are disclosed herein that enable remote queries, and/or queries to be performed within or otherwise on a client device. However, in other embodiments, remote CPQM 390 and CPQM 270 may operate in conjunction with each other such that some actions may be performed by CPQM 390, while other actions may be performed by CPQM 270, where resulting queries, responses, data structures of the supported content protection configurations, or the like, may be shared between the two (or more) components.

General Operation

Figure 4:
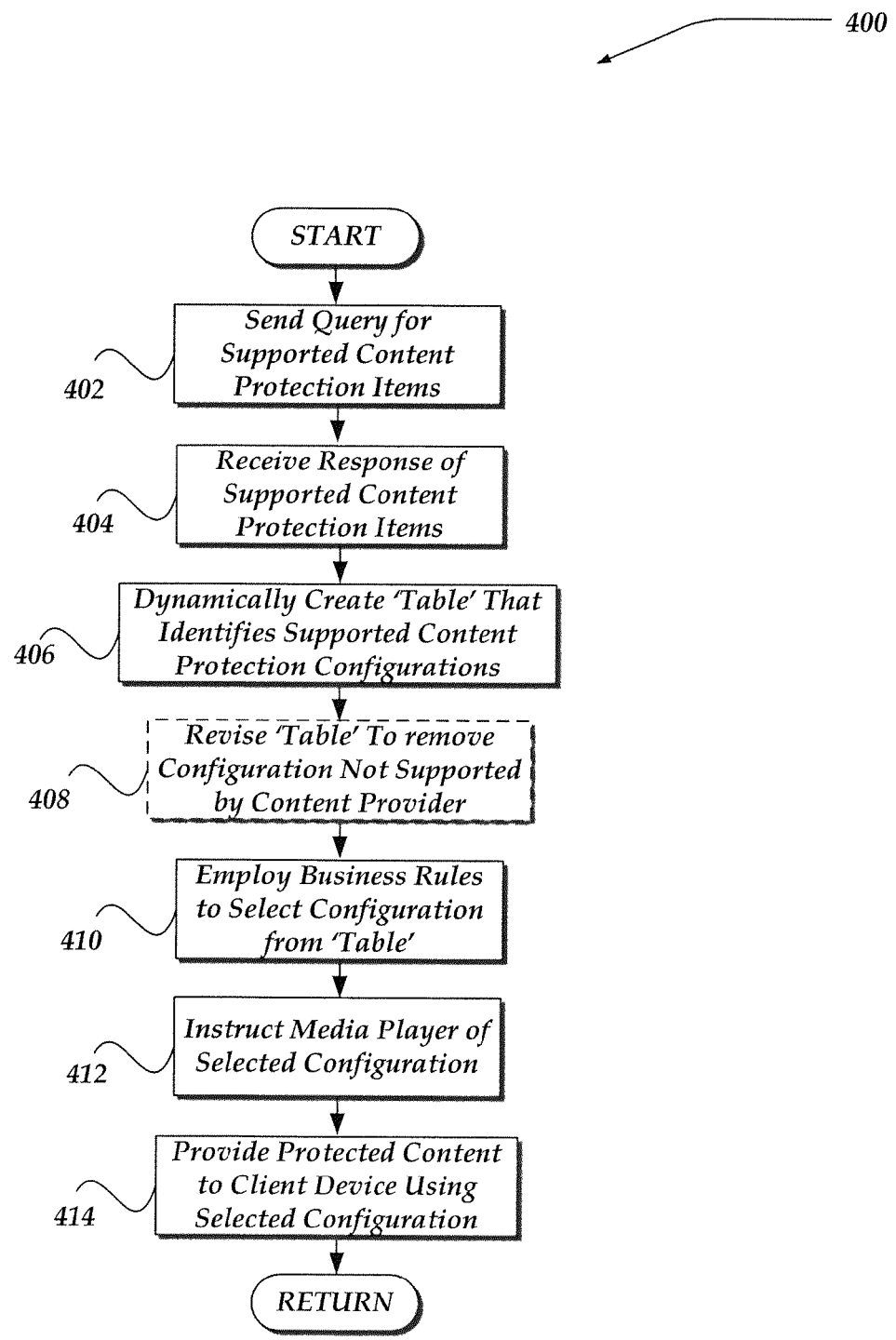
FIG. 4 illustrates a flow chart of one embodiment of a process usable to manage a selection of a supported content protection configuration on a client device.

The operation of certain aspects of various embodiments will now be described with respect to FIGS. 4-5. FIG. 4 illustrates a flow chart of one embodiment of a process usable to manage a selection of a supported content protection configuration on a client device. As discussed above, process 400 of FIG. 4 may be implemented to operate within a client device, such as shown in FIGS. 1-2. However, it should be understood, that process 400 may also be configured to operate remote to a client device, such as such as remote CPQM 390 of FIG. 3. In one embodiment, a user of a client device may seek access to protected content from a content provider. During the communications, a CPQM may be installed onto the client device; may be executed through a web page, or other interface; accessed by the client device; or even operate remotely on the network device to query the client device, and perform process 400.

In any event, process 400 begins, after a start block, at block 402, where one or more queries for supported protection items may be sent to the client device (or performed within the client device). In one embodiment, the queries for the protected items may be sent to a particular media player on the client device. In another embodiment, the queries may be sent to a browser or other application within the client device, which may then provide an indication as to which media players are supported by the client device, as well.

In one embodiment, the queries may be an extension of a canPlayType( ) application programming interface (API) supported within HTML 5 or above. In one embodiment, the queries may be configured to request whether a specific DRM/CODEC/Container, or the like is supported. For example, in one embodiment, a request such as:

video.canPlayType (null, "acme")

might be sent to the client device, where the request is configured to return whether the key system or DRM module "acme" is supported. As used herein, the term "key system" may be considered to be inclusive of a DRM module.

Moving to block 404, a response is received. A response might include "yes", "no" or even, "maybe." In other embodiments, a response might include "probably," or an empty string indicating a "no." In at least one embodiment, a "maybe" response may result in additional queries to be performed, or the response may be interpreted as "no." It should be noted that other variations of responses, response formats, and structures may also be used, and that embodiments are not constrained to any particular structure, format, or representation for a response.

In any event, use of this type of query request might, however, not indicate which CODEC is supported, or container type, or the like.

Using a similar type of query request, it might be determined whether a particular version of the "acme" key system or DRM module is supported. For example:

video.canPlayType (null, "acme.1_5")

A response may again, be yes, no, or maybe. More detailed queries might include:

video.canPlayType ("video/webm; codecs='vp8, vorbis'", "acme")

In this example, a yes response would indicate that the Acme key system or DRM module is supported and that VP8 video and Vorbis audio CODECs are supported with a WebM container format.

It should be understood that the above examples are not to be construed as limiting, or exhaustive, and any of a variety of other combinations, and queries may also be performed to determine a configuration of content protection that is supported by a client device.

However, while queries may be performed that specifically request whether one or more particular content protection items are supported. The innovation is not so limited. For example, in other embodiments, a query may be sent that is a global request. For example, the following might be construed to request a response that indicates which DRM modules (or key systems) are supported:

video.canPlayType ("key_system=*")

In this, or a similar manner, a response might include a list of all key systems or DRM modules that the client device supports. Similar queries might include global requests for all CODECS, decryption standards, containers, or the like. In one embodiment, the responses might be structured to indicate which CODECs, decryption standards, containers, or the like, that a particular DRM module supports. In still another embodiment, the query may be made general to request the media players to indicate which configurations are supported by each media player. Thus, in one embodiment, a single query might be made to each media player or browser, or other application, indicating which media players is supported, and what content protection items each support. Thus, it should be clear that the subject innovations are not limited to a particular query structure, and any of a variety of queries may be performed to determine the content protection configurations supported with a client device.

Processing may then flow to block 406, where a table or other structure may then be constructed dynamically and automatically (absent a user intervention) based on the responses. One non-limiting, non-exhaustive example of a table is described in more detail below in conjunction with FIG. 5. It is noted, that while the responses are illustrated and discussed herein in terms of a 'table' other structures may also be used. For example, a linked list, a spreadsheet, a database, a text document, or the like, may also be used to organize the responses to the queries so as to identify the supported content protection configurations.

Moving next to block 408, in one embodiment, an optional action may be performed that compares the contents of the table or other structure for managing the client supported content protection configurations with protection configurations that the querying content provider may support. In this manner, should none of the protection configurations in the table or other structure be supported by the content provider, various actions may be taken. For example, in one embodiment, the content provider may request that yet another protection configuration and/or selected content protection items be downloaded, and/or otherwise installed on the client device. Similarly, if the table or other structure is empty such that there are no supported configurations at the client device, other actions may be taken, including, but not limited to the content provider recommending a configuration of components to be downloaded and installed on the client device, or even exiting process 400 such that the protected content is not provided to the client device. Other actions may also be performed.

Where the table or other structure includes some supported and some unsupported (by the content provider) protection configurations, the content provider might optionally remove or delete the unsupported configurations. In this manner, a later analysis might be performed more quickly. In any event, where the table or other structure includes protection configurations that are supported also by the content provider, processing continues to block 410, where various business rules and policies may be applied to select one of the protection configurations supported on the client device from within the table or other structure. Various rules and/or policies may be used to make such a selection. For example, in one embodiment, the selection may be based on whether the content provider pays for use of a particular DRM module, container format, or the like. In another example, the selection may be based on whether the user might have to pay for a license use, or be based on a fastest decryption, or a container format that provides a lowest network bandwidth to transfer the content, or any of a variety of other criteria. Once the protection configuration is selected, in one embodiment, process 400 proceeds to block 412, where the content provider may instruct the client device to prepare for and use the selected protection configuration.

Continuing to block 414, the content provider may then provide the protected content to the client device using the selection protection configuration. Process 400 may then return to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

Example Protection Configuration Table

Figure 5:
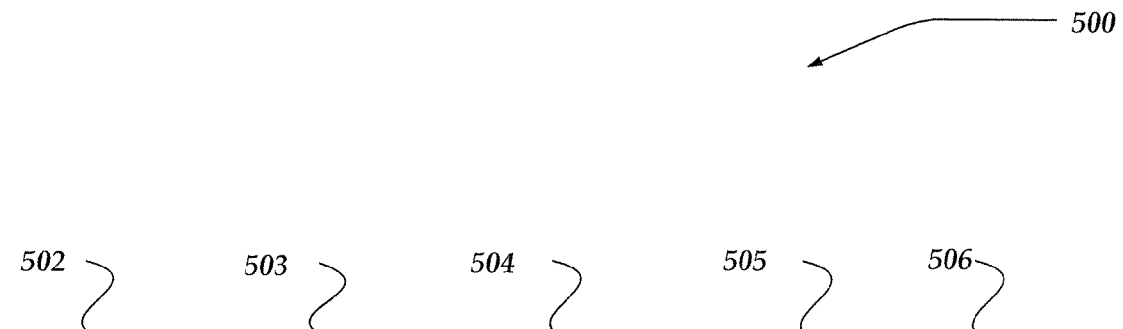
FIG. 5 illustrates one non-exhaustive, non-limiting, example of a table usable to identify content protection configurations supported by the client device and useable to select a content protection configuration for providing protected content to a client device.

FIG. 5 illustrates one non-exhaustive, non-limiting, example of a table usable to identify and select at least one content protection configuration from a plurality of content protection configurations for providing protected content to a client device. As noted elsewhere, although the example employs a table structure, other structures may also be used to organize responses to queries regarding a content protection configuration supported by a client device. Moreover, Table 500 of FIG. 5 may include many more or less components than those shown. The components shown, however, are sufficient to disclose an illustrative embodiment for practicing the invention.

In one embodiment, table 500 may be managed and/or stored in a memory device residing on the client device. However, in other embodiments, table 500 may also be managed and/or stored on a remote network device, such as network device 300. In one embodiment, table 500 may be deleted after a communication with a client device is terminated. In this manner, queries and creation of table 500 is performed during each communication request for content to be provided to a client device. This may be the case because a client device's configuration may change, and therefore, the table may no longer be valid. A current table configuration is desirable. However, other mechanisms may be used. For example, a cookie, applet, or the like, might be left on a client device, such that when a protection configuration is changed on the client device, the cookie, applet, or the like, might indicate that a change has been detected, or even that no change is detected. In this manner, the content provider might first perform an initial examination of the deposited applet, cookie, or the like. Should the examination indicate a change is detected, and then the queries of process 400 might be performed again. However, should no change be detected, then the process 400 need not be performed and the earlier created table might be reused. In one embodiment, table 500 may be stored on the client device for future use. In another embodiment, table 500 may be stored remotely along with a client device identifier. In another embodiment, just the selected configuration may be stored.

In any event, table 500 includes columns 502-506, which are each automatically created from the responses received to the queries discussed above in process 400 of FIG. 4. As shown, columns 502-504 include supported items: key systems 502, CODECs 503 for each key system within key systems 502, decryptions 504, and containers 505. Thus, as shown, for example, one supported content protection configuration indicates that the "widevine" key system (or DRM module) supports CODECS H.264, VP8, and Theora. Further, for use with H.264, the decryption supported is AES. The key system "widevine" for the CODEC H.264 and AES decryption further supports MPEG-2, MPEG-4, FLV, MOV, and 3GP containers. Other examples are also illustrated. Clearly, not only is the table merely an example, but, is non-exhaustive. Thus, embodiments are not constrained to the examples illustrated herein in table 500.

Moreover, column 506 is intended to represent that any of a variety of other content protection items may be included in considering a content protection configuration. Thus, queries, and the resulting table might also include various decryption configurations, versions of key systems, protection levels, profiles supported, robustness levels supported, or the like. Virtually any content protection item of interest to the content provider might be queried and included in table 500.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A client device, comprising:
a network interface card to receive content over a network;
a non-transitory computer-readable storage medium storing executable computer program code; and
one or more processors configured to execute the computer program code to perform steps, comprising:
sending a request for access to protected content over the network;
receiving, in response to the request, a content protection query module;
executing the content protection query module within the client device to:
generate a plurality of queries to the client device about content protection items supported on the client device;
receive responses to the plurality of queries from the client device;
apply a content protection policy to the responses to the plurality of queries, the content protection policy prioritizing a content protection configuration based on a digital rights management module, container format and decryption key system supported on the client device;
select the content protection configuration based on the application of the content protection policy to the responses to the plurality of queries; and
instruct the client device to configure the client device to receive the protected content in the selected content protection configuration;
receiving the protected content in the selected content protection configuration; and
playing the received protected content using the selected content protection configuration.

2. The client device of claim 1, wherein the content protection query module is further executable to:
automatically generate a structure based on the received responses to the plurality of queries, the structure storing and managing the plurality of content protection items supported on the client device.

3. The client device of claim 1, wherein the plurality of queries comprises separate queries specifically requesting whether the client device supports a particular content protection item.

4. The client device of claim 1, wherein the plurality of queries comprises at least one query requesting the client device to provide information indicating each content protection configuration that the client device supports.

5. The client device of claim 4, wherein the content protection configuration comprises an indication of which digital rights management (DRM) modules are supported by the client device, and for each DRM module, which container format is supported, and which coders/decoders are supported.

6. A network device, comprising:
one or more memory storage devices storing executable computer program code; and
one or more processors configured to execute the computer program code to perform steps comprising:
receiving a request from a client device for protected content;
sending to the client device in response to the request, a content protection query module, wherein the content protection query module is adapted to execute on the client device to:
generate a plurality of queries to the client device about content protection items supported on the client device;
receive responses to the plurality of queries from the client device;
apply a content protection policy to the responses to the plurality of queries, the content protection policy prioritizing a content protection configuration based on a digital rights management module, container format and decryption key system supported on the client device;
select the content protection configuration based on the application of the content protection policy to the responses to the plurality of queries; and
instruct the client device to configure the client device to receive the protected content in the selected content protection configuration; and
sending the protected content in the selected content protection configuration to the client device.

7. The network device of claim 6, wherein the plurality of queries comprises queries using a canPlayType( ) Application Programming Interface.

8. The network device of claim 6, wherein the plurality of queries comprises separate queries specifically requesting whether the client device supports a particular content protection item.

9. The network device of claim 6, wherein the plurality of queries comprises at least one query requesting the client device to provide information indicating each content protection configuration that the client device supports.

10. The network device of claim 6, wherein the selected content protection configuration is stored on the client device.

11. The network device of claim 6, wherein the content protection configuration comprises at least two of a digital rights management module, a container format, a coder/decoder and a decryption type.

12. A method, comprising:
sending a request for access to protected content over a network;
receiving, in response to the request, a content protection query module;
executing the content protection query module within a client device to:
generate a plurality of queries to the client device about content protection items supported on the client device;
receive responses to the plurality of queries from the client device;
apply a content protection policy to the responses to the plurality of queries, the content protection policy prioritizing a content protection configuration based on a digital rights management module, container format and decryption key system supported on the client device;
select the content protection configuration based on the application of the content protection policy to the responses to the plurality of queries; and
instruct the client device to configure the client device to receive the protected content in the selected content protection configuration;
receiving the protected content in the selected content protection configuration; and
playing the received protected content using the selected content protection configuration.

13. The method of claim 12, wherein the content protection query module is further executable to:
automatically generate a structure based on the received responses to the plurality of queries, the structure storing and managing the plurality of content protection items supported on the client device.

14. The method of claim 12, wherein the plurality of queries comprises separate queries specifically requesting whether the client device supports a particular content protection item.

15. The method of claim 12, wherein the plurality of queries comprises at least one query requesting the client device to provide information indicating each content protection configuration that the client device supports.

16. The method of claim 15, wherein the content protection configuration comprises an indication of which digital rights management (DRM) modules are supported by the client device, and for each DRM module, which container format is supported, and which coders/decoders are supported.

17. The method of claim 12, wherein the selected content protection configuration indicates network bandwidth required to transfer the protected content.

18. The method of claim 12, wherein the content protection policy prioritizes a content protection configuration based on a container format that provides a lowest network bandwidth to transfer the protected content.

19. The method of claim 12, wherein the content protection policy prioritizes a content protection configuration based on a fastest decryption provided by a decryption key system supported on the client device.

\* \* \* \* \*